United States Patent [19]

Fukushima et al.

[11] 4,440,375

[45] Apr. 3, 1984

[54] ENGINE MOUNTING STRUCTURE FOR AUTOMOTIVE VEHICLE

[75] Inventors: Masao Fukushima, Fuchu; Komei Yazaki, Yokohama, both of Japan

[73] Assignee: Nissan Motor Company, Limited, Yokohama, Japan

[21] Appl. No.: 251,855

[22] Filed: Apr. 7, 1981

[30] Foreign Application Priority Data

Apr. 17, 1980 [JP] Japan .................. 55-51350

[51] Int. Cl.³ ............................................ F16M 13/00
[52] U.S. Cl. ..................................... 248/559; 248/659
[58] Field of Search ................... 248/559, 659, 605; 267/140.1; 180/300, 312, 291

[56] References Cited

U.S. PATENT DOCUMENTS

3,388,772  6/1968  Marsh et al. ........................ 188/1

FOREIGN PATENT DOCUMENTS

1135312  4/1957  France .
2431639  2/1980  France .
2444852  7/1980  France .
2071266  9/1981  United Kingdom .

OTHER PUBLICATIONS

"Ingenieurs de l'Automobile (1980), No. 5, Jun.-Jul.-Aug., Boulogne, FR", M. Goerges Rodier, pp. 52 to 55.

Primary Examiner—J. Franklin Foss

[57] ABSTRACT

An engine mounting structure for mounting an automotive engine on the body structure of an automotive vehicle, comprising the parallel combination of a main oscillatory system adapted to damp vibrations produced by the engine during medium-speed cruising of the vehicle and an auxiliary oscillatory system adapted to cancel the vibrations to be transmitted through the main oscillatory system under high-speed cruising conditions of the vehicle for reducing booming noises to be produced in the vehicle cabin under such conditions. The auxiliary oscillatory system comprises at least two rigid mass members and at least three resilient blocks structurally intervening between the main oscillatory system and the mass members.

4 Claims, 16 Drawing Figures

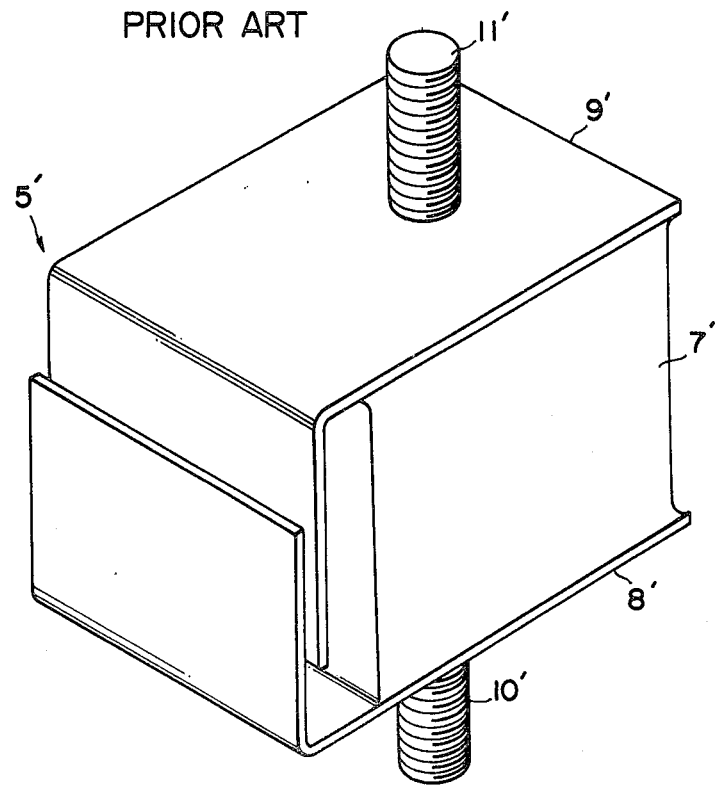

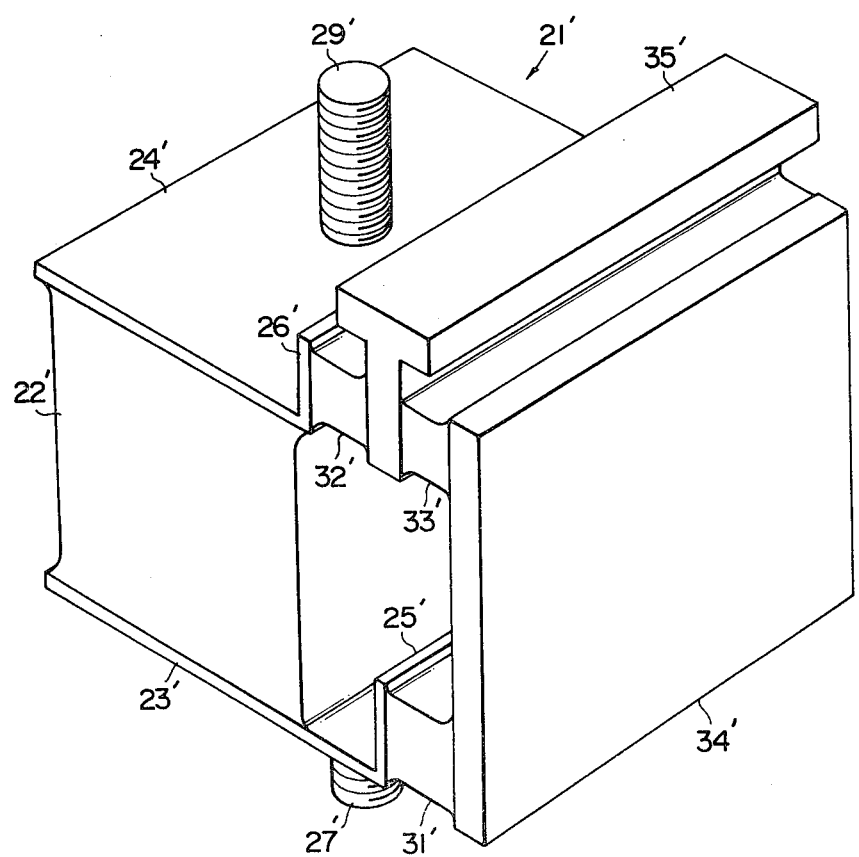

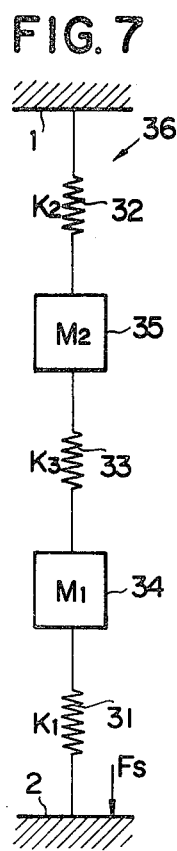
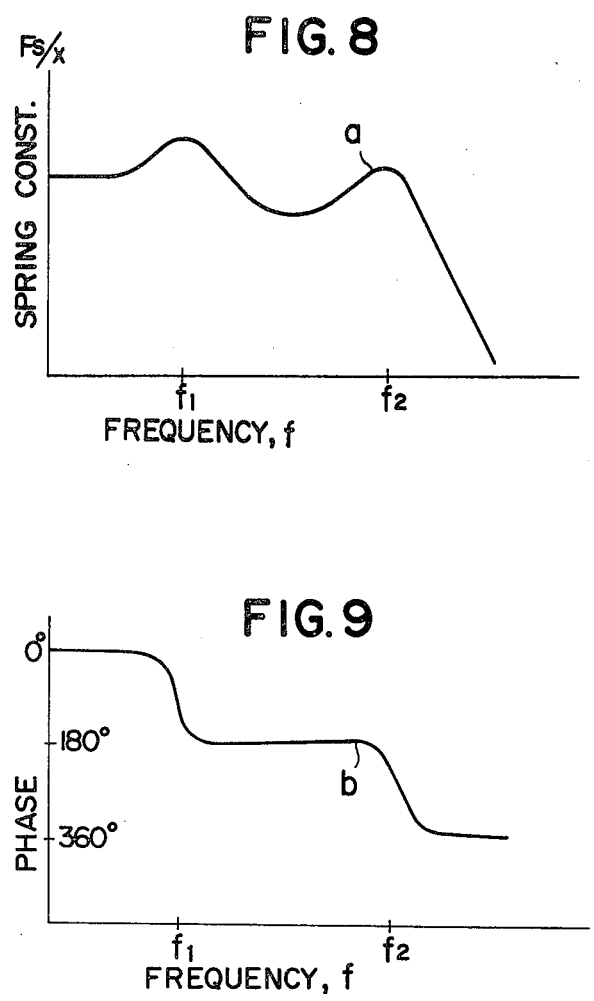

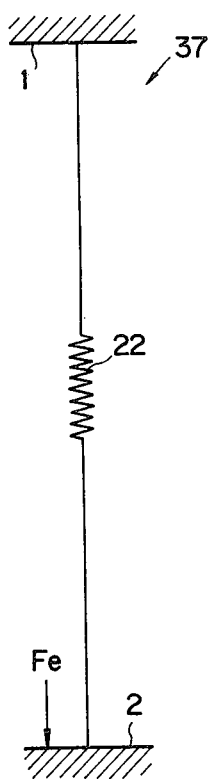
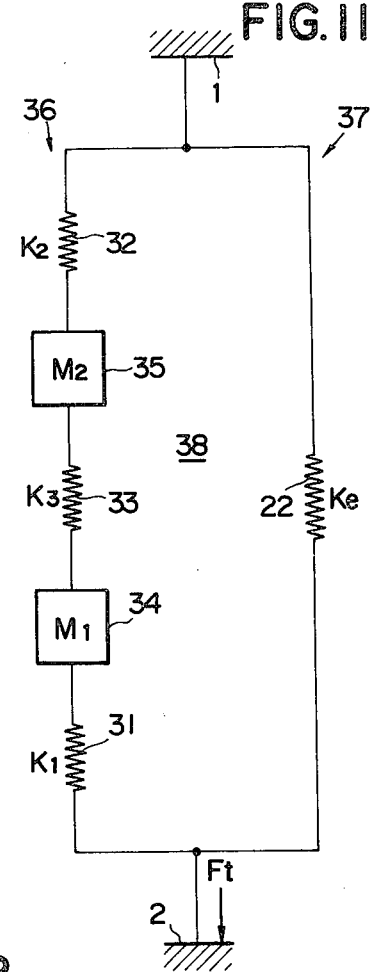
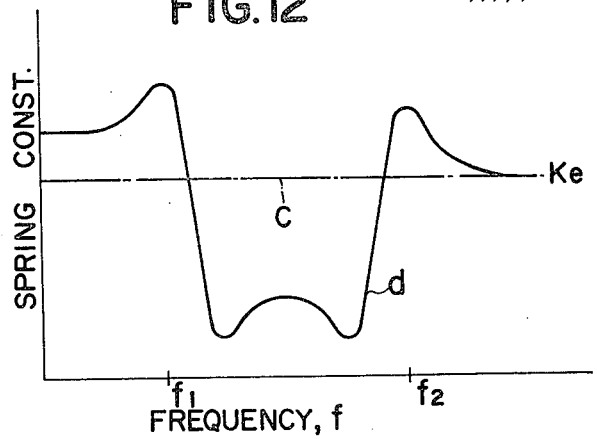

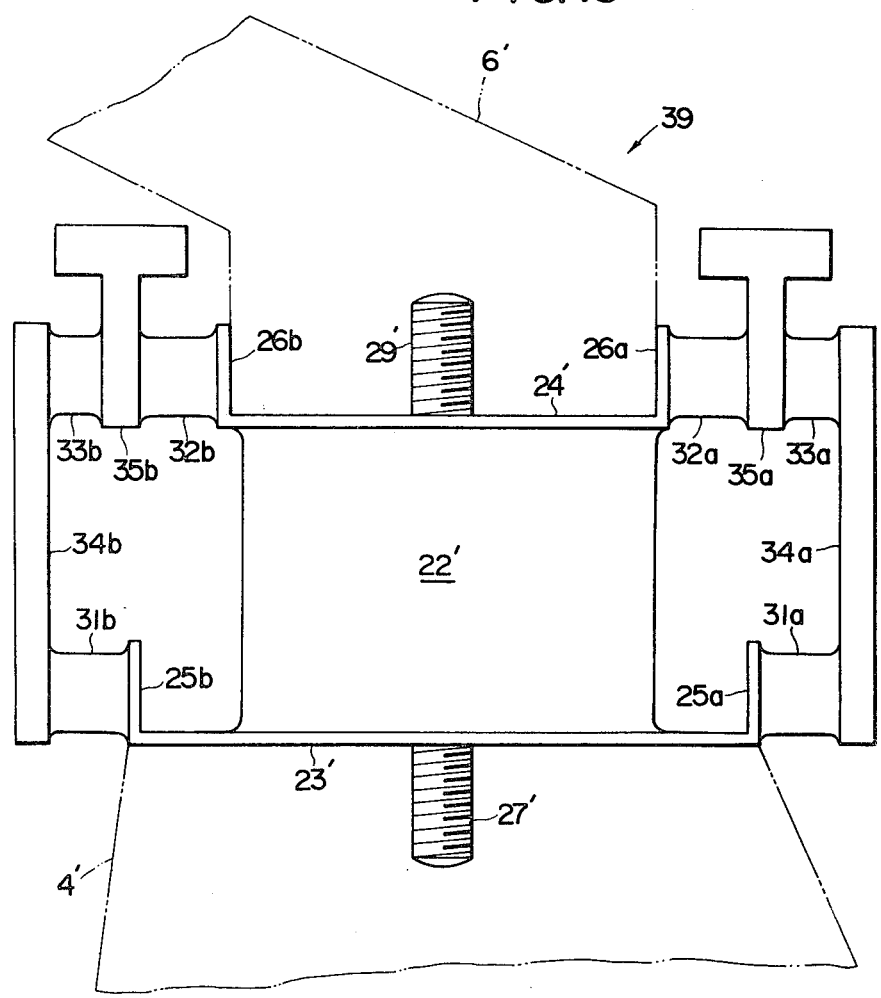

ENGINE MOUNTING STRUCTURE FOR AUTOMOTIVE VEHICLE

FIELD OF THE INVENTION

The present invention relates to an engine mounting structure used for the mounting of a power plant such as an internal combustion engine on the body structure of an automotive vehicle.

BRIEF DESCRIPTION OF THE PRIOR ART

A conventional engine mounting structure used for the mounting of an internal combustion engine on the body structure of an automotive vehicle comprises a pair of shock and vibration insulating units each using a resilient block. The resilient block is connected between the body structure of the vehicle and an engine-side bracket secured to the engine mounted on the vehicle body structure. In a prior-art engine mounting structure of this nature, the resilient block forming part of the shock and vibration insulating unit is usually designed to have a relatively large spring constant so as to be capable of taking up the vibrations of the engine under medium-speed cruising conditions of the vehicle.

During high-speed cruising of an automotive vehicle, the engine tends to produce vibrations at frequencies within a certain relatively low range. The vibrations of the engine at such frequencies, in turn, tend to cause production of stifled, droning noises or "booms" in the vehicle cabin. In order that the shock and vibration insulating unit of a conventional engine mounting structure be capable of absorbing such low-frequency vibrations, the resilient block of the shock and vibration insulating unit is required to have an increased weight. This results in unwieldy construction of the shock and vibration insulating unit and accordingly in enlarged construction of the engine mounting structure as a whole, adding to the seriosity of the space requirement for the mounting structure and requiring additional time and labor for the installation of the engine and the engine mounting structure on the body structure of an automotive vehicle.

The present invention contemplates elimination of these and other drawbacks which have thus far been inherent in prior-art engine mounting structures for automotive vehicles.

SUMMARY OF THE INVENTION

In accordance with the present invention, there is provided an engine mounting structure for mounting an automotive engine on the body structure of an automotive vehicle, comprising at least one shock and vibration insulating unit comprising a first coupling member to be connected to the body structure of the vehicle, a second coupling member to be connected to the body structure of the engine and spaced apart from the first coupling member, a main resilient block structurally intervening between the first and second coupling means, and vibration cancelling means comprising at least one combination of a first mass member, a second mass member, a first auxiliary resilient block structurally intervening between the first coupling member and the first mass member, a second auxiliary resilient block structurally intervening between the second coupling member and the second mass member, and a third auxiliary resilient block structurally intervening between the first and second mass members so as to reduce the stifled booming noises to be produced in the vehicle cabin under high-speed cruising conditions of the vehicle.

BRIEF DESCRIPTION OF THE DRAWINGS

The drawbacks of prior-art engine mounting structures and the features and advantages of an engine mounting structure according to the present invention will be more clearly understood from the following description taken in conjunction with the following drawings in which like reference numerals designate similar to corresponding members, units and structures and in which:

FIG. 2 is a perspective view showing, to an enlarged scale, a shock and vibration insulating unit forming part of the prior-art engine mounting structure illustrated in FIG. 1;

FIG. 6 is a perspective view of the shock and vibration insulating unit shown in FIG. 5;

FIG. 7 is a diagram showing, in a modelled form, the oscillatory system constituted by the vibration cancelling means forming part of the shock and vibration insulating unit illustated in FIGS. 5 and 6;

FIG. 8 is a graph showing the variation in the spring constant, in terms of vibration frequency, achieved in the oscillatory system illustrated in FIG. 7;

FIG. 9 is a graph showing the phase characteristic of the vibrations transmitted through the oscillatory system illustrated in FIG. 7;

FIG. 10 is a diagram showing, in modelled form, the vibration system constituted by the shock and vibration insulating unit shown in FIGS. 5 and 6 when the insulating unit is assumed to be devoid of the vibration cancelling means represented by the oscillatory system illustrated in FIG. 7;

FIG. 11 is a diagram showing, in modelled form, the overall oscillatory system constituted by the shock and vibration insulating unit shown in FIGS. 5 and 6;

FIG. 12 is a graph showing the variation in the spring constant, in terms of vibration frequency, achieved in each of the oscillatory systems illustrated in FIGS. 10 and 11;

FIG. 13 is a front end view showing a shock and vibration insulating unit forming part of a second preferred embodiment of the engine mounting structure according to the present invention;

FURTHER DESCRIPTION OF THE PRIOR ART

Figure 1:
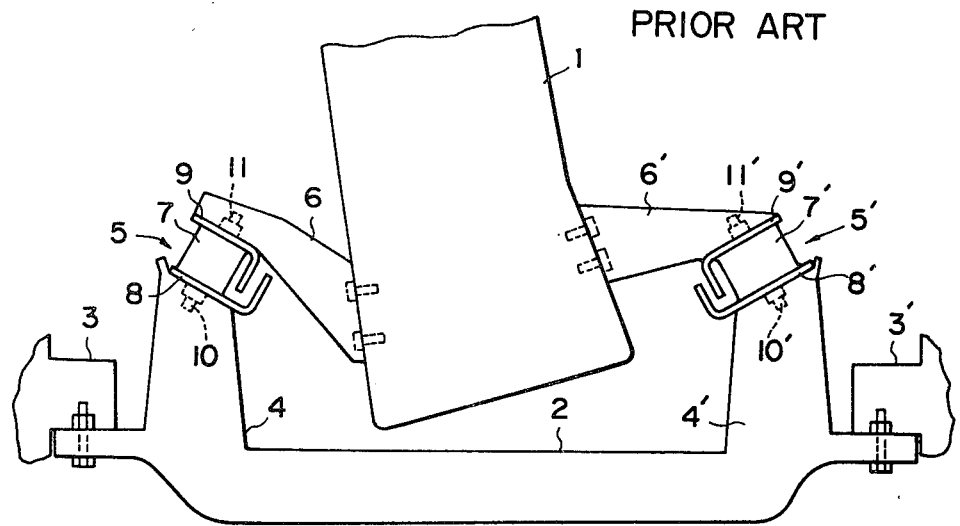
FIG. 1 is a fragmentary front elevation view showing a representative example of a prior-art engine mounting structure.

For better understanding of the features and advantages of an engine mounting structure according to the present invention over prior-art engine mounting structure, description will be hereinafter made with reference to FIGS. 1 and 2 which show a representative example of a known engine mounting structure. The engine mounting structure as shown is used for the mounting of an internal combustion engine 1 on a lateral suspension member 2 of the body structure of an automotive vehicle. The lateral suspension member 2 extends laterally of the vehicle body structure and is fixedly connected adjacent the opposite lateral ends thereof to right and left side members 3 and 3' of the vehicle body structure. The suspension member 2 thus bridging the side members 3 and 3' has a pair of upstanding bracket portions 4 and 4' positioned on body sides of the engine 1 and adjacent to the side members 3 and 3', respectively.

The prior-art engine mounting structure comprises a pair of shock and vibration insulating units 5 and 5' each of which is connected between each of the bracket portions 4 and 4' of the suspension member 2 and each of engine-side bracket members 6 and 6', respectively, which are secured to the body structure of the engine 1. More specifically, the shock and vibration insulating unit 5 positioned on one side of the engine 1 comprises a resilient block 7 having opposite end faces, a lower coupling member 8 fixedly attached to one of the end faces of the resilient block 7, and an upper coupling member 9 fixedly attached to the other end face of the resilient block 7. Similarly, the shock and vibration insulating unit 5' positioned on the other side of the engine 1 comprises a resilient block 7' having opposite end faces, a lower coupling member 8' fixedly attached to one end face of the resilient block 7', and an upper coupling member 9' fixedly attached to the other end face of the resilient block 7'.

The lower coupling members 8 and 8' are securely connected to the bracket portions 4 and 4' of the suspension member 2 by means of bolts 10 and 10', respectively, while the upper coupling members 9 and 9' are securely connected to the above mentioned engine-side bracket members 6 and 6' by means of bolts 11 and 11', respectively. The resilient blocks 7 and 7' are constructed of a material such as rubber having a spring constant which is selected in such a manner that each of the resilient blocks 7 and 7' is capable of absorbing and dampening the shocks and vibrations which are to be produced in the engine 1 under medium-speed cruising conditions of the vehicle.

Thus, each of the resilient blocks 7 and 7' has a relatively large spring constant and is for this reason capable of absorbing and dampening shocks and vibrations at medium cruising speeds of the vehicle but is not suitable for taking up the shocks and vibrations to be produced under high-speed cruising conditions of the vehicle. The vibrations produced during high-speed cruising of a vehicle are causative of production of stifled booming noises in the vehicle cabin. In order to eliminate such low-frequency noises, the resilient blocks 7 and 7' are required to have such weights that are large enough to absorb the vibrations to be produced by the engine under high-speed cruising conditions of the vehicle. As has been pointed out at the outset of the description, the provision of such heavy resilient blocks results in unwieldy construction of the engine mounting structure as a whole and requires no additional space and additional time and labor for the installation of the engine and engine mounting structure on the vehicle body.

Figure 3:
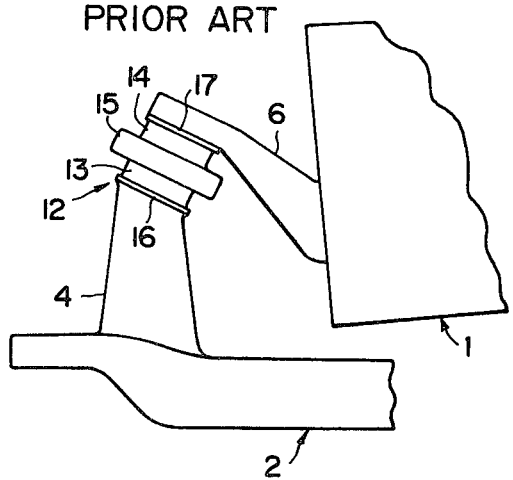
FIG. 3 is a fragmentary front elevation view showing another representative example of a prior-art engine mounting structure.

FIG. 3 shows part of another representative example of the prior-art engine mounting structure. The engine mounting structure comprises a pair of shock and vibration insulating units only one of which is shown and designated by reference numeral 12. The shock and vibration insulating unit 12 comprises lower and upper resilient blocks 13 and 14, and a rigid mass member 15 securely interposed between the resilient blocks 13 and 14. The lower resilient block 13 is securely attached to a lower coupling member 16 fixedly connected to one of the bracket portions such as the bracket portion 4 of the lateral suspension member 2 of the vehicle body structure. The upper resilient block 14 is securely attached to an upper coupling member 17 which is fixed to one of the engine-side bracket members such as the bracket member 6 secured to the body structure of the engine 1. The shock and vibration insulating unit 12 thus constructed is usually designed to be capable of absorbing and dampening vibrations with frequencies higher than about 100 Hz.

The shock and vibration insulating unit included in the prior-art engine mounting structure hereinbefore described with reference to FIG. 3 may be designed in such a manner as to be capable of taking up vibrations with frequencies of about 90 to 140 Hz which are responsible for the production of stifled, droning noises in the vehivle cabin during high-speed cruising of the vehicle. In order to design the shock and vibration insulating unit 12 in this fashion, however, it is required to use an extremely large-sized rigid block as the mass member 15. Such a large-sized mass member could not be stably mounted on the body structure of an automotive vehicle insofar as the insulating unit has the shown construction.

The present invention contemplates provision of useful solutions to these drawbacks which have been inherent in prior-are engine mounting structures of the described natures.

DESCRIPTION OF THE EMBODIMENTS

Figure 4:
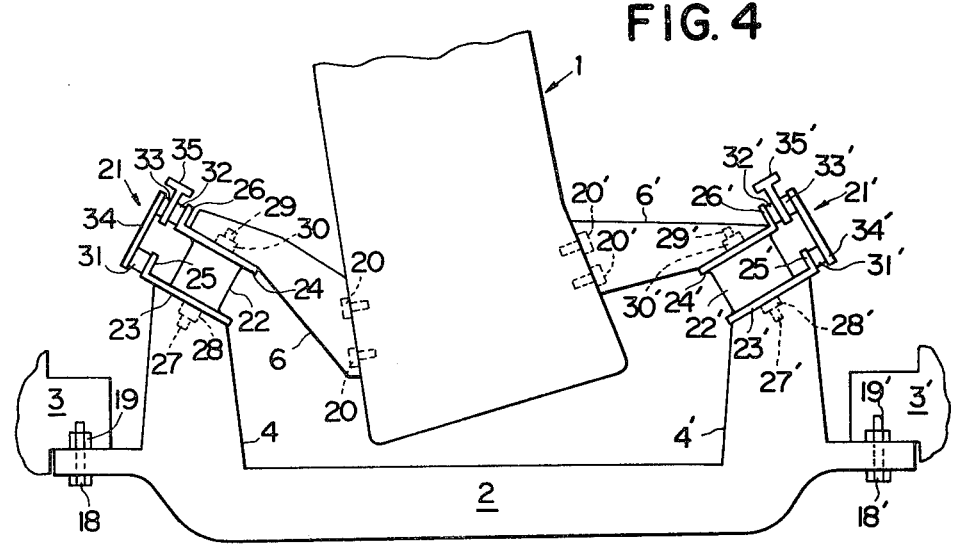
FIG. 4 is a fragmentary front elevation view showing a first preferred embodiment of the engine mounting structure according to the present invention.
Figure 5:
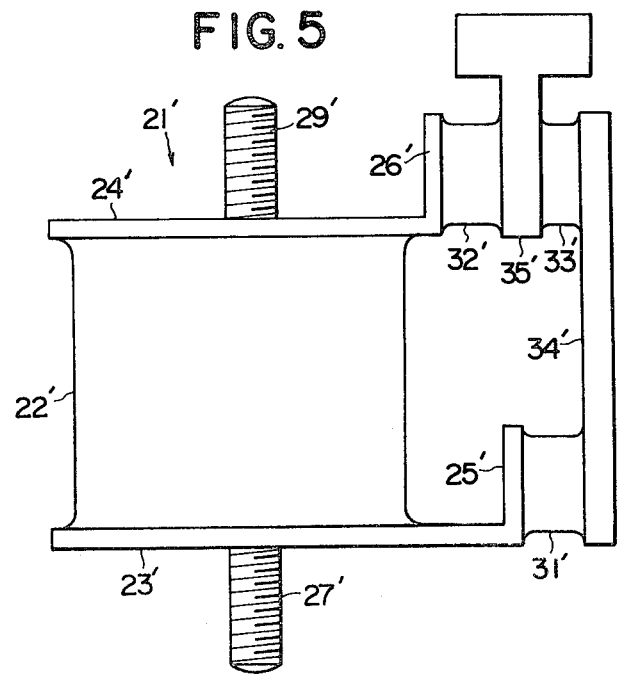
FIG. 5 is a front end view showing, to an enlarged scale, a shock and vibration insulating unit forming part of the embodiment illustrated in FIG. 4.

FIGS. 4 to 6 of the drawings show a first preferred embodiment of the engine mounting structure according to the present invention aiming at provision of such solutions.

Referring first to FIG. 4, the engine mounting structure embodying the present invention is used for the mounting of an automotive internal combustion engine 1 on a suitable lateral support member such as a front suspension member 2 of the body structure of an automotive vehicle. The lateral suspension member 2 extends laterally of the vehicle body structure and is fixedly connected adjacent the lateral ends thereof to right and left side members 3 and 3' of the body structure by suitable fastening means such as bolts 18 and 18' and nuts 19 and 19', respectively. The lateral suspension member 2 thus bridging the side members 3 and 3' of the vehicle body structure has a pair of upstanding bracket portions 4 and 4' positioned on both sides of the engine 1 and adjacent to the side members 3 and 3', respectively. Each of the bracket portions 4 and 4' has an upper end face which is slightly inclined toward the engine 1.

A pair of rigid engine-side bracket members 6 and 6' which are bolted as at 20 and 20' or otherwise securely connected to the body structure of the engine 1. Each of the bracket members 6 and 6' has a lower face spaced apart substantially in parallel from the inclined upper end face of each of the bracket portions 4 and 4' of the lateral suspension member 2.

The engine mounting structure shown in FIG. 4 further comprises a pair of shock and vibration insulating units 21 and 21' provided on both sides of the engine 1. The shock and vibration insulating unit 21 positioned on one side of the engine comprises a main resilient block 22 of, for example, rubber, having spaced, substantially parallel opposite end faces, a rigid first or lower coupling member 23 securely attached to the one of the end faces of the resilient block 22, and a rigid second or upper rigid coupling member 24 securely attached to the other end face of the resilient block 22. The shock and vibration insulating unit 21' provided on the other side of the engine 1 likewise comprises a main resilient block 22' of, for example, rubber having spaced, substantially parallel opposite end faces, a rigid first of lower coupling member 23' securely attached to one of the end faces of the resilient block 22', and a second or upper coupling member 24' securely attached to the other end face of the resilient block 22' as will be better seen from FIGS. 5 and 6. The lower and upper coupling members 23 and 24 are generally L-shaped in section and have side edge portions 25 and 26, respectively, which are bent from the remaining portions of the coupling members in directions substantially perpendicular to the above mentioned end faces of the resilient block 22. Likewise, the lower and upper coupling members 23' and 24' are generally L-shaped in section and have side edge portions 25' and 26', respectively, which are bent from the remaining portions of the coupling members in directions substantially perpendicular to the opposite end faces of the resilient block 22'. Each of the resilient blocks 22 and 22' is constructed of a suitable resilient material having a predetermined spring constant Ke.

The lower coupling member 23 is fixedly attached to the inclined upper end face of the bracket portion 4 of the suspension member 2 by suitable fastening means such as a bolt 27 welded to the coupling member 23 and secured to the bracket portion 4 by means of a nut 28. Likewise, the lower coupling member 23' is fixedly attached to the inclined upper end face of the bracket portion 4' of the suspension member 2 by suitable fastening means such as a bolt 27' welded to the coupling member 23' and secured to the bracket portion 4' by means of a nut 28'. On the other hand, the upper coupling member 24 is fixedly attached to the inclined lower face of the engine-side bracket 6 by suitable fastening means such as a bolt 29 welded to the coupling member 24 and secured to the bracket member 6 by means of a nut 30. Similarly, the upper coupling member 24' is fixedly attached to the inclined lower face of the engine-side bracket member 6' by suitable fastening means such as a bolt 29' welded to the coupling member 24' and secured to the coupling member 24' and secured to the bracket member 6' by means of a nut 30'.

Each of the shock and vibration insulating units 21 and 21' thus connected between the suspension unit 2 and the engine-side bracket members 6 and 6' further comprises vibration cancelling means adapted to cancel predetermined frequency components of the vibrations to be transmitted through the oscillatory system constituted by each of the hereinbefore described resilient blocks 22 and 22'.

In the embodiment illustrated in FIGS. 4 to 6, the vibration cancelling means of the shock and vibration insulating unit 21 is shown comprising first, second and third auxiliary resilient blocks 31, 32 and 33 and first and second mass members 34 and 35, each of the resilient blocks and mass members having substantially parallel opposite end faces. The first auxiliary resilient block 31 is securely attached over one of its end faces to the outer face of the bent side edge portion 25 of the lower coupling member 23 and over the other end face thereof to the inner end face of the first mass member 34 and, thus, structurally intervenes between the coupling member 23 and the mass member 34. The second auxiliary resilient block 32 is securely attached over one of its end faces to the outer face of the bent side edge portion 26 of the upper coupling member 24 and over the other end face thereof to the inner end face of the second mass member 35 and, thus, structurally intervenes between the coupling member 24 and the mass member 35. On the other hand, the third auxiliary resilient block 33 is securely attached over one of its end faces to the outer end face of the second mass member 35 and over the other end face thereof to the inner end face of the first mass member 34 and, thus, structurally intervenes between the first and second mass members 34 and 35. The first, second and third auxiliary resilient blocks 31, 32 and 33 are constructed of suitable resilient materials having predetermined spring constants which are herein assumed to be $K_1$, $K_2$ and $K_3$, respectively, while the first and second mass members 34 and 35 are designed to have predetermined masses which are herein assumed to be $M_1$ and $M_2$, respectively.

The vibration cancelling means of the other shock and vibration insulating unit 21' is similar in construction to the above described vibration cancelling means of the insulating unit 21 and thus comprises first, second and third auxiliary resilient blocks 31', 32' and 33' and first and second mass members 34' and 35', each of these resilient blocks and mass members also having substantially parallel opposite end faces. The first auxiliary resilient block 31' is securely attached over one of its end faces to the outer face of the bent side edge portion 25' of the lower coupling member 23' and over the other end face thereof to the inner end face of the first mass member 34' and, thus, structurally intervenes between the coupling member 23' and the mass member 34'. The second auxiliary resilient block 32' is securely attached over one of its end faces to the outer face of the bent side edge portion 26' of the upper coupling member 24' and over the other end face thereof to the inner end face of the second mass member 35' and, thus, structurally intervenes between the coupling member 24' and the mass member 35'. On the other hand, the third auxiliary resilient block 33' is securely attached over one of its end faces to the outer end face of the second mass member 35' and over the other end face thereof to the inner end face of the first mass member 34' and, thus, structurally intervenes between the first and second mass members 34' and 35'. The first, second and third auxiliary resilient blocks 31', 32' and 33' are constructed of suitable resilient materials having predetermined spring constants while the first and second mass members 34' and 35' are designed to have predetermined masses.

Each of the first mass members 34 and 34' is assumed to in the form of a flat plate and each of the second mass members 35 and 35' is assumed to have a generally T-shaped cross section, as will be seen from FIGS. 5 and 6.

The vibration cancelling means of each of the shock and vibration insulating units 21 and 21' thus constructed and arranged constitutes an oscillatory system 36 which is schematically illustrated in FIG. 7 of the drawings.

When, in operation, the vehicle is cruising at relatively high speeds, the vibrations produced in the engine 1 tend to produce booming noises in the vehicle cabin. If, under these conditions, the above mentioned oscillatory system 36 is assumed to be subjected to vibrations with the amount of displacement x and the exciting frequency f, then the force Fs transmitted from the oscillatory system 36 to the suspension member 2 is given by the following equation:

$$Fs = x/(P - Q + R),$$

where
$P = (M_1 \cdot M_2 \cdot \omega^4)/(K_1 \cdot K_2 \cdot K_3)$,
$Q = [M_1/K_1 \cdot K_2) + M_1/(K_1 \cdot K_3) + M_2/(K_1 \cdot K_2) + M_2(- K_2 \cdot K_3)]\omega^2$,
$R = 1/K_1 + 1/K_2 + 1/K_3$, and
$\omega = 2\pi f$.

The spring constant Fs/x thus determined of the oscillatory system 36 is graphically represented in terms of the vibration frequency f by curve a shown in FIG. 8. From curve a it will be understood that the spring constant Fs/x of the oscillatory system 36 assumes maximal values at certain two frequencies $f_1$ and $f_2$. On the other hand, the force Fs transmitted from the oscillatory system 36 to the suspension member 2 is in phase with the displacement x at vibration frequencies lower than the frequency $f_1$ and at vibration frequencies higher than the frequency $f_2$ and is 180 degrees out of phase with the displacement x at vibration frequencies between the two frequencies $f_1$ and $f_2$, as will be seen from curve b shown in FIG. 9.

On the other hand, each of the main resilient blocks 22 and 22' of the shock and vibration insulating units 21 and 21' forms part of an oscillatory system 37 schematically shown in FIG. 10. When the oscillatory system 37 thus constituted by each of the resilient blocks 22 and 22' is subjected to vibrations with the displacement x and the exciting frequency f, the force Fe transmitted from the oscillatory system 37 to the suspension member 2 is given by $$Fe = Ke \cdot x,$$

when the vibration components damped by the resilient block forming part of the oscillatory system 37 are excluded from the force. The spring constant Fe/x of the oscillatory system 37 remains substantially constant throughout the range of the vibration frequency f as will be seen from plot c shown in FIG. 12.

FIG. 11 shows schematically an oscillatory system 38 composed of the parallel combination of the above described oscillatory systems 36 and 37. The oscillatory system 38 shown in FIG. 11 is thus constituted by each of the shock and vibration insulating units 21 and 21' of the engine mounting structure shown in FIGS. 4 to 6. In FIG. 12 is further shown a curve d which represents the relationship between the frequency f and the spring constant Ft/x achieved of the oscillatory system 38 composed of the parallel combination of the oscillatory systems 36 and 37. As will be seen from curve d in FIG. 12, the force Ft transmitted to the suspension member 2 from the oscillatory system 38 or, in other words, each of the shock and vibration insulating units 21 and 21' is given by the sum of the forces Fs and Fe at vibration frequencies lower than the frequency $f_1$ and at vibration frequencies higher than the frequency $f_2$ and by the difference between the forces Fs and Fe at vibration frequencies higher than the frequency $f_1$ and lower than the frequency $f_2$. Thus, the oscillatory system 38 composed of the parallel combination of the main and auxiliary oscillatory system 36 and 37 exhibits performance characteristics such that the spring constant Ft/x of the system 38 as a whole is smaller than the spring constant Fe/x of the main oscillatory system 37 at vibration frequencies within the range of between the frequencies $f_1$ and $f_2$ as will be clearly seen from the curves c and d of FIG. 12. The frequencies $f_1$ and $f_2$ stand for the resonance frequencies of the suspension member 2. If, thus, each of the respective spring constants $K_1$ and $K_2$ of the first and second auxiliary resilient blocks 31 and 32 is assumed, for the sake of simplicity, to has a value k and each of the respective masses $M_1$ and $M_2$ of the first and second mass members 34 and 35 is assumed to have a value m, then the force Fs and the resonance frequencies $f_1$ and $f_2$ are given by the following equations:

$$Fs = \frac{x}{(m^2 \cdot \omega^4)/(k^2 \cdot K_3) - (2m/k) \cdot (1/k + 1/K_3) \cdot \omega^2 + (2/k + 1/K_3)}$$

$$f_1 = (1/2\pi) \cdot \sqrt{k/m} \text{ , and}$$

$$f_2 = (1/2\pi) \cdot \sqrt{(k + 2K_3)/m} \text{ .}$$

Meanwhile, it is well known in the art that the vibrations to produce booming noises in a vehicle cabin occur at frequencies ranging from about 90 Hz to about 140 Hz when the engine is of the four-cylinder four-stroke-cycle type. This means that each of the shock and vibration insulating units 21 and 21' is effective to reduce such noises to a minimum if the insulating unit is designed in such a manner that the above mentioned resonance frequencies $f_1$ and $f_2$ equal about 90 Hz and about 220 Hz, respectively. Such a purpose can be achieved when the main resilient block 22 and the first, second and third auxiliary resilient blocks 31, 32 and 33 are designed so that the spring constant Ke falls within the range of between about 25 Kgs/mm and about 45 kgs/mm, the spring constants $K_1$ and $K_2$ fall within the range of between about 5 kgs/mm and about 20 kgs/mm and the spring constant $K_3$ falls within the range of between about 10 kgs/mm and about 35 kgs/mm if each of the respective masses $M_1$ and $M_2$ of the mass members 34 and 35 is selected to fall within the range of between about 0.3 kg and about 1.0 kg. Experiments have reveraled that designing each of the shock and vibration insulating units 21 and 21' in the above described manner is conducive not only to reduction of booming noises to be produced in a vehicle cabin under high-speed cruising conditions of the vehicle but to isolation of the vehicle body from the vibrations of the engine producing vibrations at frequencies in the neighborhood of 10 Hz.

When the engine 1 is to be mounted on the suspension member 2 during assemblage of a vehicle, the shock and vibration insulating units 21 and 21' are secured to the bracket portions 4 and 4', respectively, of the suspension member 2 by the bolts 27 and 27' and nuts 28 and 28'.

The engine 1 having the engine-side bracket members 6 and 6' preliminarily attached thereto by the bolts is thereafter assembled to the shock and vibration insulating units 21 and 21' by tightening the bolts 29 and 29' to the engine-side bracket members 6 and 6' by means of the nuts 30 and 30', respectively.

Figure 14:
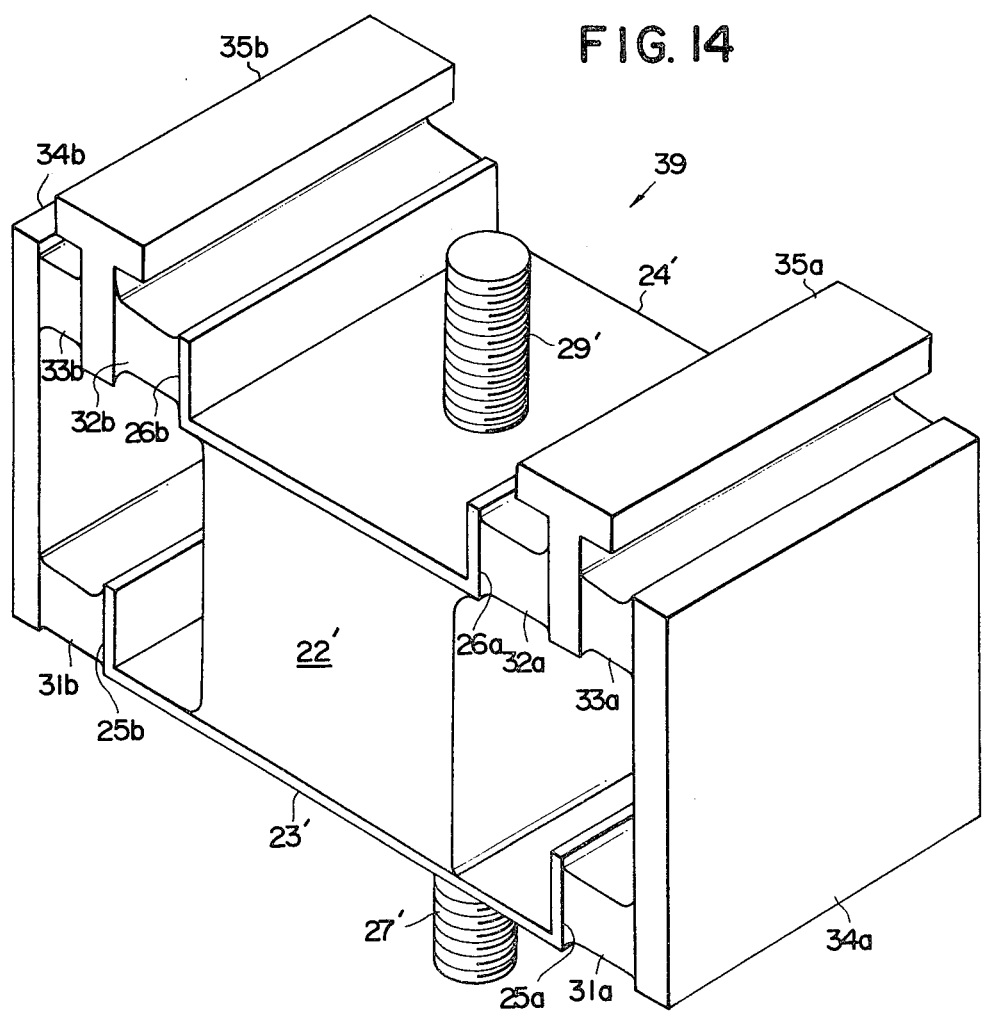
FIG. 14 is a perspective view of the shock and vibration insulating unit illustrated in FIG. 13.

FIGS. 13 and 14 of the drawings show a shock and vibration insulating unit 39 which forms part of a second embodiment of the engine mounting structure according to the present invention. The shock and vibration insulating unit 39 is a modification of the insulating unit 21' shown in FIGS. 5 and 6 and constitutes one of two such units of an engine mounting structure embodying the present invention.

As illustrated in FIGS. 13 and 14, the shock and vibration insulating unit 39 comprises a main resilient block 22' of, for example, rubber having substantially parallel opposite end faces, a rigid first or lower coupling member 23' securely attached to one of the end faces of the resilient block 22', and a rigid second or upper coupling member 24' securely attached to the other end face of the resilient block 22'. The lower coupling member 23' is generally U-shaped in section and has a pair of side edge portions 25a and 25b which are spaced apart substantially in parallel from each other and which are bent from the remaining portion of the coupling member 23' in directions substantially perpendicular to the above mentioned end faces of the resilient block 22'. Likewise, the upper coupling member 24' is generally U-shaped in section and has a pair of side edge portions 26a and 26b which are spaced apart substantially in parallel from each other and which are bent from the remaining portion of the coupling member 24' in directions substantially perpendicular to the end faces of the resilient block 22'. The side edge portions 26a and 26b of the upper coupling member 24' are spaced apart from and substantially aligned with the side edge portions 25a and 25b, respectively, of the lower coupling member 23' in directions parallel with the direction of thickness of the resilient block 22'. The resilient block 22' is constructed of a suitable resilient material having a predetermined spring constant.

The shock and vibration insulating unit 39 shown in FIGS. 13 and 14 of drawings further comprises a pair of vibration cancelling means which are provided symmetrically across the main resilient block 22'. Each of these two vibration cancelling means is similar in construction to the vibration cancelling means of each of the shock and vibration insulating units 21 and 21' in the embodiment of FIG. 4. Thus, the vibration cancelling means of the shock and vibration insulating unit 39 shown in FIGS. 13 and 14 comprises a pair of first auxiliary resilient blocks 31a and 31b, a pair of second auxiliary resilient blocks 32a and 32b, a pair of third auxiliary resilient blocks 33a and 33b, a pair of first mass members 34a and 34b, and a pair of second mass members 35a and 35b. Each of these resilient blocks and mass members has opposite end faces which are substantially parallel with each other. The first auxiliary resilient blocks 31a and 31b are fixedly attached each over one of its end faces to the outer faces of the bent side edge portions 25a and 25b, respectively, of the lower coupling member 23' and over the other end faces thereof to the inner faces of the first mass members 34a and 34b, respectively. The second auxiliary resilient blocks 32a and 32b are fixedly attached each over one of its end faces to the outer faces of the bent side edge portions 26a and 26b, respectively, of the upper coupling member 24' and over the other end faces thereof to the inner faces of the second mass members 35a and 35b, respectively. Thus, each of the first auxiliary resilient blocks 31a and 31b structurally intervenes between the lower coupling member 23' and each of the first mass members 34a and 34b and, likewise, each of the second auxiliary resilient blocks 32a and 32b structurally intervenes between the upper coupling member 24' and each of the second mass members 35a and 35b. On the other hand, the third auxiliary resilient blocks 33a and 33b are fixedly attached each over one of its end faces to the outer faces of the second mass members 35a and 35b, respectively, and over the other end faces thereof to the inner faces of the first mass members 34a and 34b, respectively. Each of the third auxiliary resilient blocks 33a and 33b thus structurally intervenes between each of the first mass members 34a and 34b and each of the second mass members 35a and 35b. Each of the auxiliary resilient blocks 31a, 31b, 32a, 32b, 33a and 33b is constructed of a suitable resilient material having a predetermined spring constant and each of the mass members 34a, 34b, 35a and 35b is designed to have a predetermined mass. Though not shown in the drawings, the shock and vibration insulating unit 39 thus constructed is securely connected to the bracket portions of a suitable cross member such as a front suspension member of a vehicle body structure by means of, for example, a bolt 27' projecting from the lower coupling member 23' and further to the body structure of an automotive engine by means of, for example, a bolt 29' projecting from the upper coupling member 24' and screwed to one of suitable engine-side bracket members secured to the body structure of the engine.

As will be readily understood from the foregoing description, each of the two vibration cancelling means forming part of the shock and vibration insulating unit 39 shown in FIGS. 13 and 14 constitutes an oscillatory system similar to the oscillatory system 36 illustrated in FIG. 7. Thus, the engine mounting structure using the shock and vibration insulating unit 39 is adapted to provide a wide range of selection among various performance characteristics which can be varied by varying the respective performance characteristics of the oscillatory systems constituted by the two vibration cancelling means of the unit 39.

Figure 15:
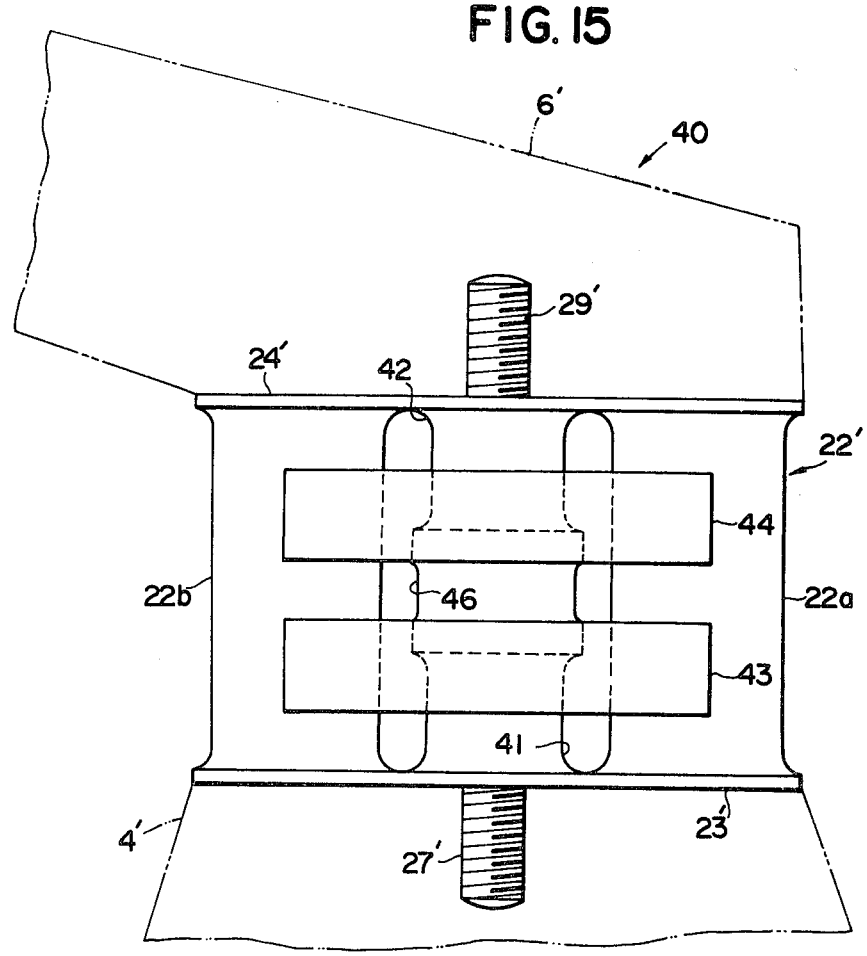
FIG. 15 is a front end view showing a shock and vibration insulating unit forming part of a third preferred embodiment of the engine mounting structure according to the present invention.
Figure 16:
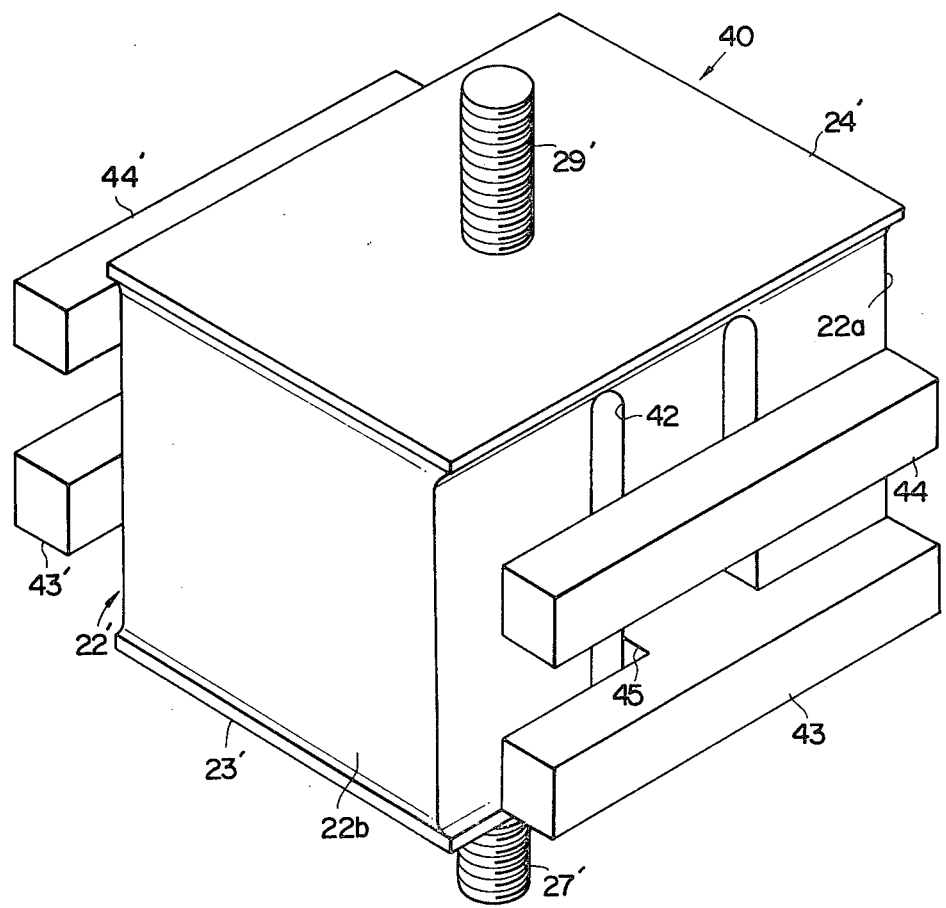
FIG. 16 is a perspective view of the shock and vibration insulating unit illustrated in FIG. 15.

FIGS. 15 and 16 of the drawings show a shock and vibration insulating unit 40 which forms part of third preferred embodiment of the engine mounting structure according to the present invention. The shock and vibration insulating unit 40 is also a modification of the insulating unit 21' shown in FIGS. 5 and 6 and constitutes one of the two such shock and vibration insulating units of an engine mounting structure embodying the present invention.

As illustrated in FIGS. 15 and 16, the shock and vibration insulating unit 40 comprises a main resilient block 22' consisting of two independent sections 22a and 22b which are spaced apart substantially in parallel from each other and each of which has substantially parallel opposite end faces. The shock and vibration insulating unit 40 further comprises a rigid first or lower coupling member 23' securely attached to one of the end faces of each of the sections 22a and 22b, and a rigid second or upper coupling member 24' securely attached to the other end faces of the sections 22a and 22b. The resilient block 22' thus composed of the two sections 22a and 22b is constructed of a suitable resilient material such as rubber having a predetermined spring constant.

The shock and vibration insulating unit 40 shown in FIGS. 15 and 16 further comprises vibration cancelling menas comprising first and second or lower and upper auxiliary resilient blocks 41 and 42 positioned intermediate between the sections 22a and 22b of the main resilient block 22' and each having substantially parallel opposite end faces. The lower auxiliary resilient block 41 is securely attached over one of its opposite end faces to the inner faces of the lower coupling member 23' and, likewise, the upper auxiliary resilient block 42 is securely attached over one of its end faces to the inner face of the upper coupling member 24'. Furthermore, the lower and upper auxiliary resilient blocks 41 and 42 are sidewise spaced apart from the sections 22a and 22b of the main resilient block 22' and has the other end faces thereof spaced apart substantially from each other as will be seen from the illustration by broken lines in FIG. 15.

The vibration cancelling means of the shock and vibration insulating unit 40 shown in FIGS. 15 and 16 further comprises a pair of first mass members 43 and 43' and a pair of second mass members 44 and 44'. The first and second mass members 43 and 44 are positioned on one side of the main resilient block 22' and the first and second mass members 43' and 44' are positioned on the other side of the resilient block 22' as will be seen from FIG. 16. As will also be seen from FIG. 16, each of the mass members 43, 43', 44 and 44' has a lug portion 45 projecting into the spacing between the sections 22a and 22b of the main resilient block 22'. Each of the four mass members is designed to have a predetermined mass.

The vibration cancelling means of the insulating unit 40 illustrated in FIGS. 15 and 16 further comprises a third auxiliary resilient block 46 which has substantially parallel opposite end faces and which is fixedly attached over one of its end faces to the respective lug portions 45 of the first mass members 43 and 43' and over the other end face thereof to the respective lug portions 45 of the second mass members 44 and 44'. Thus, the third auxiliary resilient block 46 structurally intervenes between each of the first mass member 43 and 43' and each of the second mass members 44 and 44'.

Each of the auxiliary resilient blocks 41, 42 and 46 of the shock and vibration insulating unit 40 is also constructed of a suitable resilient material such as compressible rubber having a predetermined spring constant. The use of a compressible rubber as the material of the resilient blocks 41, 42 and 46 will add to the durability and accordingly the service life of the shock and vibration insulating unit 40 as a whole.

Though not shown in the drawings, the shock and vibration insulating unit 40 thus constructed is securely connected between one of the bracket portions of a suitable cross member such as a front suspension member of a vehicle body structure by means of, for example, a bolt 27' projecting from the lower coupling member 23' and further to the body structure of an automotive engine by means of, for example, a bolt 29' projecting from the upper coupling member 24' and screwed into one of engine-side bracket members secured to the engine body structure.

From the foregoing description it will have been appreciated that the engine mounting structure according to the present invention is characterized by the provision of the vibration cancelling means in each of the shock and vibration insulating units of the structure. By virtue of such vibration cancelling means, not only transmission of vibrations from the engine to the vehicle body structure during medium-speed cruising of the vehicle but also production of stifled booming noises in the vehicle cabin under high-speed cruising conditions of the vehicle can be precluded effectively.

What is claimed is:

1. An engine mounting structure for mounting an automotive engine on the body structure of an automotive vehicle, comprising at least one shock and vibration insulating unit which comprises:

a first coupling member to be connected to the body structure of the vehicle;

a second coupling member to be connected to the body structure of the engine and spaced apart from the first coupling member;

a main resilient block intervening directly between the first and second coupling members; and vibration cancelling means comprising at least one combination of a first mass member, a second mass member, a first auxiliary resilient block intervening directly between said first coupling member and said first mass member, a second auxiliary resilient block directly intervening between said second coupling member and said second mass member, and a third auxiliary resilient block directly intervening between the first and second mass members.

2. An engine mounting structure as set forth in claim 1, in which said main resilient block consists of two substantially similar sections spaced apart from each other and in which said first and second coupling members have respective inner faces securely attached to said sections, said first and second auxiliary resilient blocks being securely attached to the inner faces of said first and second coupling members, respectively, and being spaced apart from each other and from said sections, each of said first and second mass members having a portion extending between said sections and between said first and second auxiliaty resilient blocks, said third auxiliary resilient block being closely interposed between the respective portions of the first and second mass members so that the portion of each of the mass members is closely interposed between said third auxiliary resilient block and each of said first and second auxiliary resilient blocks.

3. An engine mounting structure as set forth in claim 2, in which each of said auxiliary resilient blocks is constructed of compressible rubber.

4. An engine mounting structure as set forth in any one of claims 1 to 3 in which said combination constitutes one of two such combinations, the two combinations being provided across said main resilient block.

* * * * *